United States Patent
Mizrahi et al.

[11] Patent Number: 5,541,766
[45] Date of Patent: Jul. 30, 1996

[54] GAIN CONTROL FOR OPTICALLY AMPLIFIED SYSTEMS

[75] Inventors: Victor Mizrahi, Bedminster; Kenneth L. Walker, New Providence, both of N.J.

[73] Assignee: AT&T Corp., Murray Hill, N.J.

[21] Appl. No.: 346,662

[22] Filed: Nov. 30, 1994

[51] Int. Cl.⁶ .................................................. H01S 3/00
[52] U.S. Cl. ...................... 359/337; 359/341; 372/6
[58] Field of Search ........................... 359/337, 341; 372/6

[56] References Cited

U.S. PATENT DOCUMENTS

| | | | |
|---|---|---|---|
| 4,953,939 | 9/1990 | Epworth | 350/96.19 |
| 5,260,823 | 11/1993 | Payne et al. | 359/341 |
| 5,271,024 | 12/1993 | Huber | 372/6 |
| 5,283,686 | 2/1994 | Huber | 359/337 |
| 5,311,606 | 5/1994 | Asakura et al. | 385/33 |
| 5,321,708 | 6/1994 | Tohmon et al. | 372/6 |
| 5,323,404 | 6/1994 | Grubb | 372/6 |

*Primary Examiner*—Mark Hellner

[57] ABSTRACT

A gain control arrangement for an optical amplifier for equalizing its amplification versus wavelength response at specific frequencies. A high loss attenuating fiber with reflective gratings to segregate undesired signals from wanted signals. Using either an optical circulator or a fused fiber splitter the gain control arrangement is coupled to the wide band output of an optical amplifier.

12 Claims, 3 Drawing Sheets

GAIN CONTROL FOR OPTICALLY AMPLIFIED SYSTEMS

FIELD OF THE INVENTION

This invention relates to optical Communications' System, and more particularly to the use of fiber gratings in reflection in combination with attenuating fiber sections to provide gain control at differing wavelengths.

BACKGROUND OF THE INVENTION

Optical Communication Systems are desired because of the wide bandwidths available for the information signal channels. However, the available wide bandwidths for the signal content also permits noise to be present over the same wide bandwidths so that both the desired signals and undesired noise is amplified by the optical system amplifiers. In addition, rare earth-doped fiber amplifiers (such as Erbium or Erbium-Ytterbium doped), while useful as broad band optical amplifiers have a significant drawback in that the gain is not uniform over the optical wavelength. This becomes a particularly significant problem in wavelength division multiplexed (WDM) Systems, where multiple wavelengths are to be amplified simultaneously.

An approach which introduces excessive loss has been the use of complex passive filters designed to "flatten" the gain versus wavelength curve of broad band optical amplifiers. Another approach discussed in U.S. Pat. No. 5,283,686 is to combine an Erbium fiber optic amplifier with a narrow bandwidth optical filter. The optical filter is formed of an in-fiber Bragg grating induced in the fiber by photo-refractive effects so that the grating reflects a vary narrow band of wavelengths constituting the desired signal. This approach, however, while improving the gain versus wavelength characteristics selectively at different frequencies, does not effectively flatten the curve response or provide a precise control for multiple signals across a broad band of wavelengths, such as would be desirous in a WDM System.

SUMMARY OF THE INVENTION

In accordance with the present invention, gain control or gain equalization for optical systems is provided utilizing in combination in a spectral control single mode filter fiber gratings in reflection interconnected in series with a high loss "attenuating" fiber of appropriate length so that the relative loss (low transmissitivity) at the different wavelengths is adjusted as well as the desire gain (high transmissitivity) at targeted frequencies. The gratings, placed in series, can be made substantially 100% reflecting at the desired signal wavelengths or bands, and can be written directly into the attenuating fiber. Alternatively, the gain of the grating can be made less than 100% reflecting when desired to equalize the gain or establish a low transmissitivity between desired bands. The gratings can also have their peak reflection wavelength remotely controllable so as to provide adjustment of the loss curve at a distant location by adjusting the temperature or strain on the reflective grating.

In accordance with one aspect of the present invention, one or more of reflective gratings and high loss fiber sections are interconnected and coupled to one port of an optical circulator. Signals are connected from the output of a broad band amplifier into the first optical port and the gain corrected signals are formed at the third circulator port. The circulator can be replaced with a fused fiber splitter, where the insertion loss of the splitter is acceptable or can be compensated with an optical amplifier.

In yet another embodiment of the present invention the output of an optical amplifier is coupled via an isolator to one or more reflective gratings each of less than 100% reflectivity so as to adjust the signal strengths at the different predetermined wavelength channels. Unwanted or rejected signals are reflected back to isolators.

Note that one may wish to adjust the signal strengths so as to equalize signals or signal-to-noise ratio, or so as to have the relative strengths adjusted to any other desirable ratios. Importantly, each separate embodiment of the optical gain control arrangement can be remotely controlled to provide fine tuning of the gain versus wavelength curve. Since reflective grating wavelengths have a temperature dependency, the operating characteristics of the arrangement can be adjusted by varying the environmental temperature surrounding a particular grating Accordingly, signals may be sent by wire, or transmitted to a local control circuit, so as to affect the temperature and thereby the gain at particular wavelengths. The gratings may also be adjusted by applying a strain to tune the spectral characteristics of the filter by adjusting the mean reflection wavelength.

These as well as other advantages and features of this invention will be appreciated from a reading of the following detailed description and by careful inspection of the drawing.

DETAILED DESCRIPTION OF VARIOUS ILLUSTRATIVE EMBODIMENTS

Figure 1:
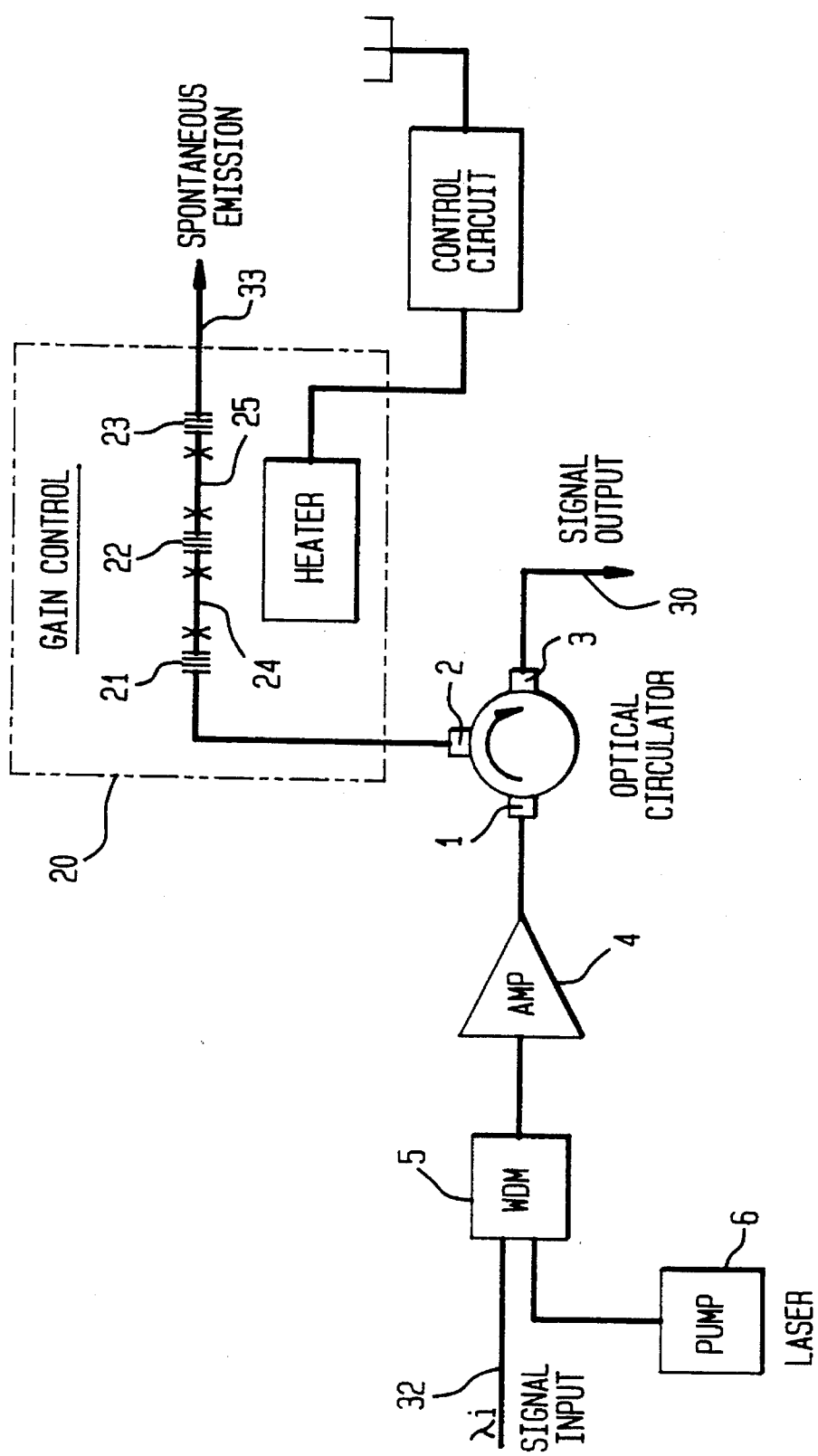
FIG. 1 which is a schematic illustration of the preferred embodiment of an optical gain control arrangement using an optical circulator in combination with series connected reflective gratings and interconnected high loss fiber sections in accordance with the principles of the present inventions.

Referring now to FIG. 1 there is illustrated a fiber optic system 10 which includes an Erbium fiber optic amplifier integrated with a gain control 20 which is capable of correcting and equalizing signals received from the output of amplifier 4. The input signal designated as 32 is coupled to a WDM device 5 which is able to pass all of the required wavelengths with a minimum of insertion loss. WDM 5 is coupled to amplifier 4 which is in turned coupled to optical circulator port 1. For convenience, the three ports of optical circulator 11 have been respectively labeled ports 1, 2 and 3. In optical circulator 11 the signal input at port 1 is rotated to circulator port 2.

Grating reflectors 21, 22 and 23 are connected in series to port 2 of circulator 11. The optical filter or Gain control 20 consist of a series of reflective gratings such as by way of illustration grating 21, 22 and 23 interconnected in series and interconnected between pairs of gratings are sections of high loss "attenuating" fibers designated by numerals 24 and 25. In accordance with the preferred embodiment of this invention gratings 21, 22 and 23 have been placed in series and can each be made substantially 100 percent reflecting at desired signal wavelengths. Also in accordance with the present invention high loss attenuating fiber sections 24 and 25 of appropriate length are spliced between reflecting gratings so that the relative loss at the different wavelengths is adjusted to yield the desired gain equalization. In multiplexed systems, each channel wavelength can be equalized separately using the strength of the reflector (10% to 100%); or by using a section of attenuation of fiber and locating a reflector in that fiber section.

On example of a high loss fiber suitable for attenuation of optical power in single mode fiber components and systems is HLF-707 produced by AT&T. This fiber design consists of a Ge-AL co-doped silica core which has been doped to produce high optical absorption. Its transmission properties allow its use as an attenuations fiber on single mode fiber components and systems with attenuation determined by the fiber length. Typically, such attenuations are greater than 50 dB/km.

Figure 4:
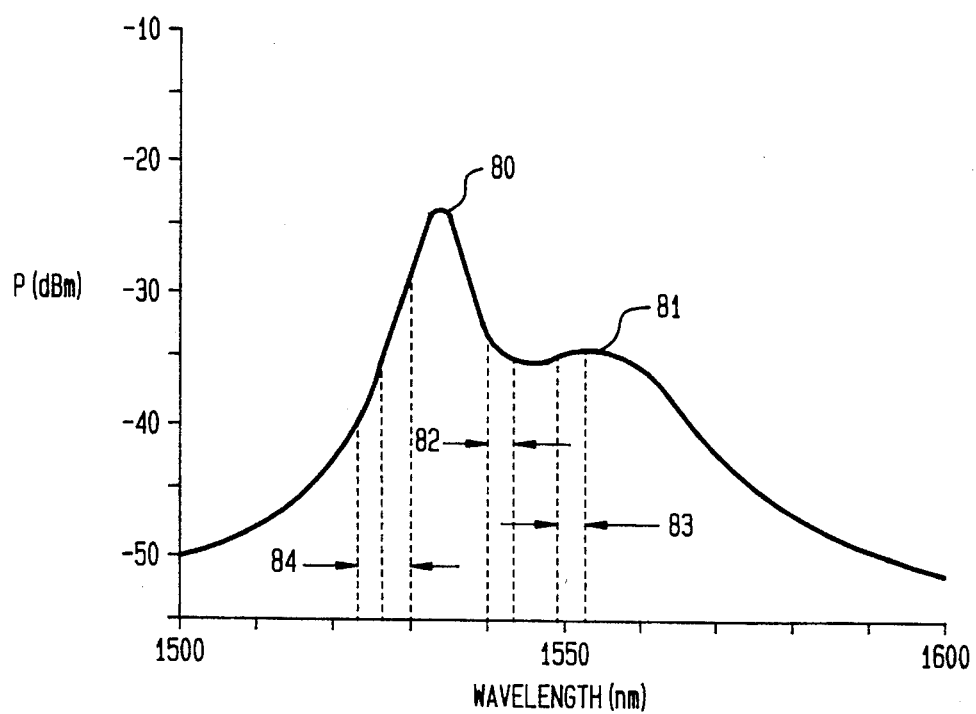
FIG. 4 is in illustration of the gain spectrum of an erbium-doped fiber amplifier before and after it is equalized according to the invention using the combination of series connected reflective gratings interconnected with high loss fiber sections to generate a desired nonuniform spectral shape.

Referring briefly to FIG. 4 there is shown a typical amplifier gain versus wavelength curve having peaks 80 and 81 which shows the response of the characteristic of optical amplifiers. In accordance with the present invention a series of attenuating high loss cable sections with reflective gratings are assembled so that the resultant gain versus wavelength characteristic is as shown for curve 83 which depicts in dotted line the attenuated portions of the gain curve which results from the appropriate combination of gratings and high loss insertion cable sections. Advantageously, the present invention can be utilized to equalize bands $B_1$, $B_2$ & $B_3$ when the optical system is designed to optimize transmission of these bands.

Accordingly, the signal that is reflected back by gain control 20 has eliminated therefrom the unwanted spontaneous emissions or noise and has adjusted the signal so as to either correct for particular amplifier 4 response characteristics or provide correction in anticipation of a subsequent down stream amplifier (not shown) response characteristic. The desired signal reflected to circulator port 2 is then rotated to circulator port 3 and coupled to output line 30.

FIG. 1 depicts gain control 20 in combination with heater 13. In accordance with the present invention heater 13 may be adjusted by control circuit 14 which is responsive to remote signals received over antenna line 15 to raise or to lower the ambient environmental temperature surrounding gain control 20 As may be appreciated a similar heater control circuit and remote control arrangement can be placed about gain controls shown in FIGS. 2 and 3 to provide remote control of the gain characteristic in those particular embodiments. For maximum selectivity and precise control it would desirable to control temperature (or strain) of each grating individually.

Figure 2:
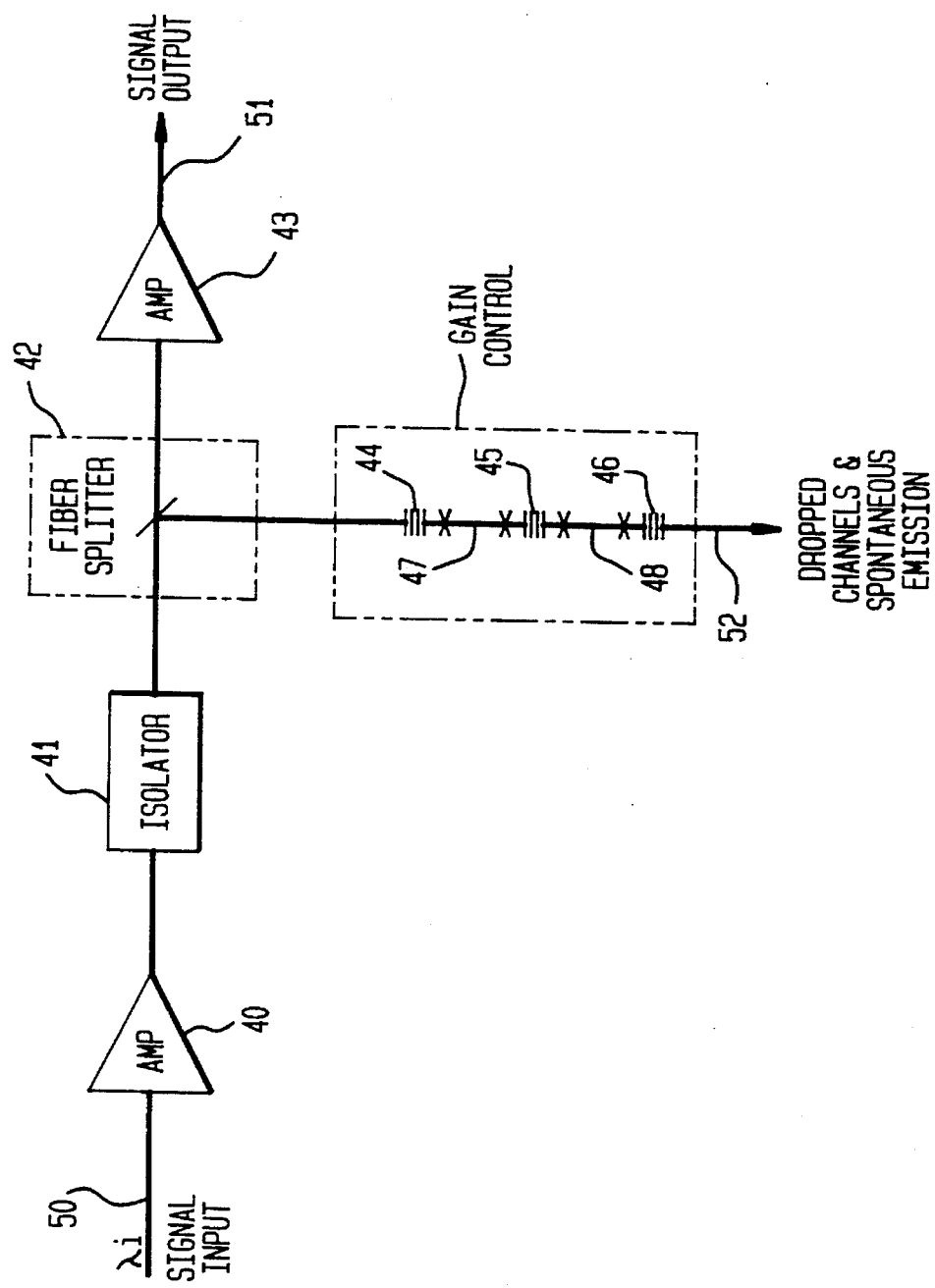
FIG. 2 is a schematic illustration of another embodiment similar to that of FIG. 1 except that the optical circulator is replaced by a fused fiber splitter.

FIG. 2 shows an arrangement which bears a close resemblance to that of FIG. 1 except for the use of a fused fiber splitter or waveguide splitter 42 in place of optical circulator 11. Amplified signals from Amplifier 40 are coupled through isolator 41 which functions to prevent reflected signal from entering the amplifier. The output of amplifier 40 coupled through isolator 41 is connected into gain control 53. Gain control 53 is composed of various reflective gratings and high loss cable sections. For example, reflective gratings 44, 45 and 46 and high loss sections 47 and 48 which coupled the respective pairs of gratings. In accordance with the present invention unwanted signals and/or emissions are not reflected back to fiber splitter 42 and are instead directed to line 52 where those signals exit from the system. Reflected signals which in accordance with the present invention represent the desired signals which have been corrected are coupled across fiber splitter 42 amplifier 43 and ultimately coupled to line 51, the signal output of FIG. 1.

Figure 3:
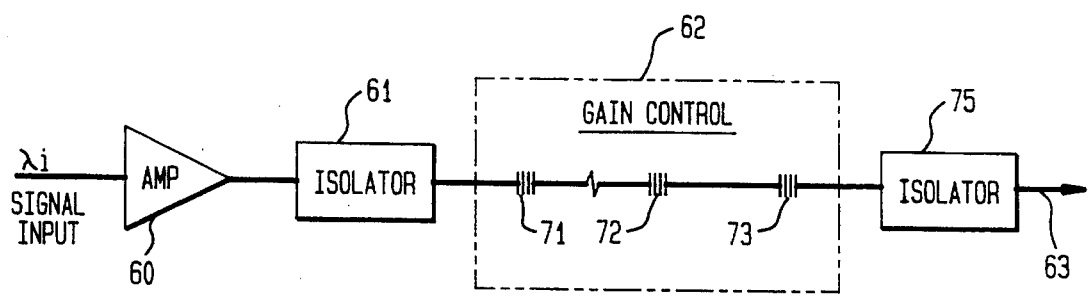
FIG. 3 is a schematic illustration of yet another embodiment depicting the gain control arrangement of the instant invention in series with the output of an optical amplifier separated by an optical isolator.

FIG. 3 is an alternative embodiment of the present invention and it shows gain control 62 which is structurally similar to gain controls 20 of FIG. 1 and 53 of FIG. 2, in series between amplifier 60 and output line 63. More specifically signals are coupled to amplifier 60 and through isolator 61 to gain control 62 which is composed of an inline single mode fiber having a number of reflective gratings 71, 72 and 73 each of less than 100% reflectivity. In this fiber arrangement no attenuating fiber are utilized. Unwanted signals in this embodiment are actually reflected toward isolator 61 and desired signals pass through gain control 62 and isolator 75. This is the main difference between FIGS. 1 & 2 and the instant embodiment. Signals passing through gain control 62 as may be appreciated can be attenuated at various wavelengths in accordance with the desire correction needed in the gain versus wavelength characteristic curve. More precisely, the gain control 62 (or optical filter) is non-reflector at one or more of the desired signal bands and reflective at undesired signal bands to generate bands B1, B2 & B3 as shown in FIG. 4.

This invention, as will become apparent, is particularly suited to equalization of optical signal bands in optical multiplexed fiber communication systems. As is well known those systems generically comprise multiplex and de-multiplex units to integrate and segregate modulated signal bands to conform to the transmission medium, for example, an optical fiber. Usually, one or more optical amplifiers, the number being dependent on loss and distance, are needed in such systems. Among other factors, the nonlinearity of opticals amplifiers response to differing wave lengths gives rise to the need for gain control or equalization. In multiplexed system that response variation is accommodated by the instant invention which provides the design capacity to insert loss through attenuating fiber in combination with selective reflectivity losses using gratings. Proper design will allow a single equalizer section to adjust for nonlinearly in the entire system and importantly, improve response at the optical receiver.

Numerous modifications and alternative embodiments of the invention will be apparent of those skilled in the art in view of the foregoing description. Accordingly, this description is to be construed as illustrative only and is for the purpose of teaching those skilled in the art the best mode of caring out the invention. Details of the structure may be varied substantially without departing from the spirit of the invention and the exclusive use of all modifications which come within the scope of the appended claim is reserved.

We claim:

1. An optical filter having a single mode fiber input port as well as a single mode fiber output port capable of providing high transmissitivity at two or more desired signal bands and low transmissitivity between at least two undesired signal bands comprising:

a spectral control single mode fiber which incorporates two or more fiber gratings each of which are substantially reflective at the desired signal bands;

means for coupling said input port to said spectral control single mode fiber; and said coupling means also coupling the reflected signal from said spectral control fiber to said output port, and said spectral control single mode fiber also including at least one wave length dependent loss element effective to make the transmission of at least one of the undesired signal bands unequal to the other signal bands.

2. The invention set forth in claim 1 wherein said loss element consists of gratings whose reflectivities are not all equal.

3. The invention of claim 2 further including means for adjusting the mean reflection wavelength of one or more of said fiber gratings by adjusting strain.

4. The invention of claim 2 further including means for adjusting the mean reflection wavelength of one or more of said fiber gratings by adjusting temperature.

5. The invention in claim 1 wherein said loss element includes a fiber with attenuations greater than 50 dB/km.

6. The invention in claim 5 further including means for adjusting the spectral characteristics of the filter by adjusting the fiber attenuation loss.

7. The invention in claim 1 wherein said coupling means is an optical circulator having at least three ports.

8. The invention in claim 1 wherein the coupling means is a wave guide splitter.

9. An optical filter for interacting in an optical communication system with a transmitted optical wideband signal to generate a desired nonuniform spectral shape of one or more signal bands comprising:

an inline single mode fiber having one or more fiber gratings with reflectivities of less than 100% and being not all equal at the desired signal bands;

optical isolation means for eliminating reflected signals; and strain adjusting means means for adjusting the mean reflection wavelength of one or more of said fiber gratings by adjusting strain.

10. An optical filter for interacting in an optical communication system with a transmitted optical wideband signal to generate a desired nonuniform spectral shape of one or more signal bands comprising:

an inline single mode fiber having one or more fiber gratings with reflectivities of less than 100% and being not all equal at the desired signal bands;

optical isolation means for eliminating reflected signals; and temperature adjusting means for adjusting the mean reflective wavelength of one or more of said fiber gratings by adjusting the temperature environment of said gratings.

11. A remotely controllable optical filter capable of deriving a desired nonuniform spectral shape utilizing a spectral control single mode fiber incorporating at least one fiber grating which is reflective at a desired signal band comprising means for adjusting the mean reflection wavelength of said grating by adjusting the strain; and means connected to a remote location for receiving information signals to change the reflection wavelength.

12. A remotely controllable optical filter capable of deriving a desired nonuniform spectral shape utilizing a spectral control single mode fiber incorporating at least one fiber grating which is reflective at a desired signal band comprising means for adjusting the mean reflection wavelength of said grating by adjusting the temperature; and means connected to a remote location for receiving information signals to change the reflection wavelength.

* * * * *

UNITED STATES PATENT AND TRADEMARK OFFICE
CERTIFICATE OF CORRECTION

PATENT NO. : 5,541,766

DATED : July 30, 1996

INVENTOR(S) : Mizrahi

It is certified that error appears in the above-identified patent and that said Letters Patent is hereby corrected as shown below:

Col. 5, line 36, Claim 9 delete 2nd occurrence of "means".

Signed and Sealed this

Twenty-fifth Day of July, 2000

Attest:

Q. TODD DICKINSON

Attesting Officer

Director of Patents and Trademarks